United States Patent [19]
Fabrizio et al.

[11] 3,753,625
[45] Aug. 21, 1973

[54] CUTTING TOOL HOLDER OR ADAPTOR

[76] Inventors: Ralph S. Fabrizio, 108 Kenwood Ave.; Nicholas J. Georgette, 192 Winfield Dr., both of Stratford, Conn.

[22] Filed: July 28, 1971

[21] Appl. No.: 166,749

[52] U.S. Cl............... 408/239, 408/710, 408/714, 287/53 TK, 287/129, 64/11 B, 64/28 R, 81/52.4, 81/177 F
[51] Int. Cl............................................. B25b 13/00
[58] Field of Search................. 408/239, 241, 710, 408/714; 10/141 F; 287/53 TK, 129, 86; 64/28 R, 11 B, DIG. 1; 81/177 F, 52.4

[56] References Cited
UNITED STATES PATENTS

| | | | |
|---|---|---|---|
| 881,075 | 3/1908 | Hosking | 408/710 X |
| 903,904 | 11/1908 | Smith | 81/177 F |
| 1,776,525 | 9/1930 | Talbot | 64/28 R |
| 1,870,153 | 8/1932 | Thoman | 64/28 R |
| 2,157,996 | 5/1939 | Brownstein | 64/28 R |
| 2,761,298 | 9/1956 | Jarvis | 408/710 X |
| 3,301,101 | 1/1967 | McEwen | 64/28 R X |

*Primary Examiner*—Andrew R. Juhasz
*Assistant Examiner*—Z. R. Bilinsky
*Attorney*—Arthur T. Fattibene

[57] ABSTRACT

This disclosure is directed to a cutting tool holder, wrench or adaptor, as for example, a tap wrench and the like, having a body portion which includes a flexible bellows torque drive which permits limited angular displacement between the body of the holder or adaptor and the center line of the tool bit to maintain alignment between the cutting tool bit and the hole or tap being formed in an associated work piece during a cutting or forming operation. The tool holder further includes a shear safety to prohibit any breakage of the tool bit in the event the applied torque moment exceeds those forces which would otherwise break the tool bit.

17 Claims, 11 Drawing Figures

Patented Aug. 21, 1973

INVENTORS
RALPH S. FABRIZIO
NICHOLAS J. GEORGETTE
BY
Arthur F. Fattibene
ATTORNEY

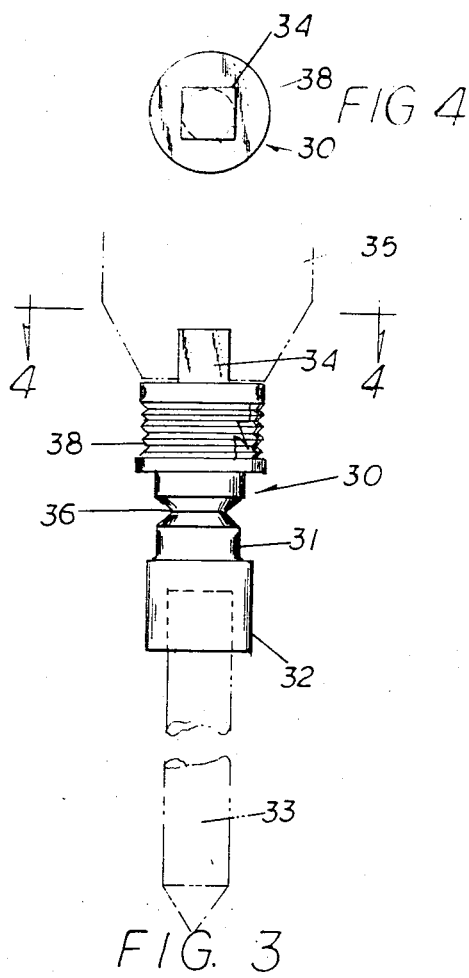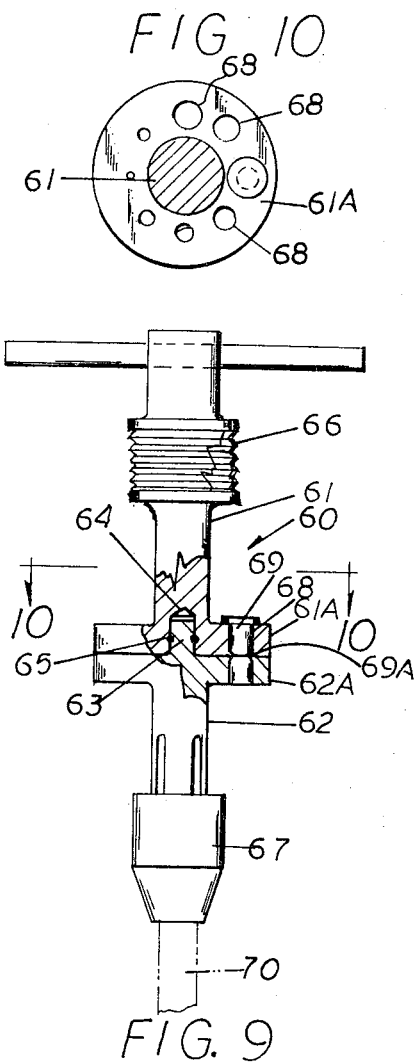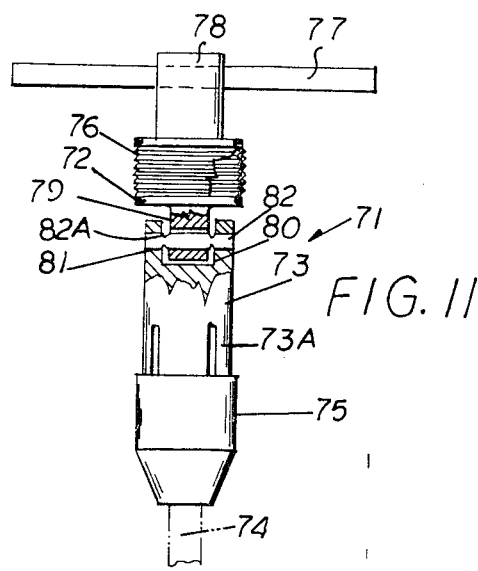

CUTTING TOOL HOLDER OR ADAPTOR

PROBLEM AND PRIOR ART

In drilling, tapping, boring or reaming a hole in a work piece with known types of drilling, tapping, reaming or boring tools, it is imperative that the requisite amount of torque be applied to the tool bit in an axial direction in order to maintain hole alignment. In drilling, boring, reaming or tapping a hole in a work piece, it frequently happens that the application of excessive torque and/or bending moment to the tool would cause the cutting tool, as for example, a tap, to either affect the hole alignment and/or to break within the hole being formed thereby. If breakage occurred, considerable lost time and effort was required to effect removal of the broken bit or tap from the work piece. Not infrequently the work piece in which such tap or tool bit broke would be severely damaged during the attempt to effect the removal of the broken tool therefrom.

To overcome this problem of the tool bit breaking in the hole, efforts have been made to provide such cutting tool bits with a weakened or frangible area adjacent the upper end of the tool bit so that in the event excessive torque was applied to the tool bit the bit would break at a point remote from the hole being formed thereby. By providing for breakage to occur externally of the hole being formed, removal of the tool from the work piece could thus be facilitated. U. S. Pat. Nos. 2,101,347 and 2,740,947 evidence the prior known efforts to provide such tool bits with a weakened area to alleviate the problem of breaking a tool bit or tap in a work piece. However, the teachings of these prior known efforts do not result in a complete solution to all of the conditions or problems encountered in forming a tap or hole in a work piece. While the known efforts tended to obviate the problem of breakage of the tool bit from occurring within the hole upon the application of excessive torques, the known efforts did not provide a desired solution to the misalignment problem resulting from the application of excessive torque and/or bending moment to the tool bit in a non-axial manner. Thus with the known tool constructions the application of even a slight force in a non-axial direction frequently results in a bending moment which will adversely affect the trueness or alignment of a hole or bore being formed. The application of non-axial forces to such tool bits also greatly increased the incidence of breakage to occur in the tap or bit and/or at the weakened point thereof. Thus while the known art accommodated for breakage of the tap or bit to occur at a point remote from the hole, there still remained unsolved the problem of maintaining hole alignment in the event excessive torque or bending moment is applied to the tool bit in a non-axial manner, and/or minimizing the incident of breakage resulting from such bending moments.

OBJECTS

It is therefore an object of this invention to provide a tool holder or adaptor in which effective alignment can be maintained between the cutting tool bit and the hole being formed in the work piece even though the torque and/or bending moment is applied in a non-axial direction.

Another object is to provide an improved cutting tool or holder having a flexible drive coupling for permitting limited angular displacement between the tool holder and the center line of the cutting tool or tool bit.

Another object of this invention is to provide a tool holder or adaptor which includes a flexible torque drive in conjunction with a shear safety means for limiting the amount of torque applied to a tool bit to prohibit overstressing the tool bit.

Another object of this invention resides in a tool holder or adaptor having a frangible means of predetermined stress which is adapted to fracture when the applied torque moment exceeds a predetermined amount.

Another object of this invention is to provide a tool holder or wrench to prohibit improper twisting or bending occurring in normal hand turning from being transferred to the cutting tool to minimize tool bit breakage.

Another object of this invention is to provide a cutting tool holder or wrench which enables the user to visibly notice any unusual twisting or bending during a forming or cutting operation.

Another object of this invention is to provide a tool holder or wrench having a flexible torque drive which assures alignment between the cutting tool and the work piece being formed thereby.

BRIEF SUMMARY OF THE INVENTION

The foregoing objects and other features and advantages are attained by a tool holder, wrench or adaptor having a body defining a tool holding end portion and an opposed handle end portion with a flexible torque drive coupling interposed therebetween. The torque drive coupling comprises a flexible bellows which permits limited angular displacement between the body of the tool holder or wrench and the center line of the tool bit adapted thereto. The invention further contemplates the utilization of a frangible member having a predetermined shear stress which is designed to fracture in the event the applied torque moment applied on the tool holder exceeds a predetermined amount.

In one form of the invention the tool holder may be formed of upper and lower body portions interconnected in driving relationship by the frangible member designed to fracture when the applied torque moment exceeds a predetermined limit. Provision is also provided for interchanging variously rated frangible members which are proportioned to the various size tool bits adapted to be accommodated by a given holder or wrench. This is attained by providing the respective upper and lower body portions with means for receiving any of several differently sized frangible members so that by the selection of the appropriate frangible member, the torque imparted to the tool before fracture occurs may be varied according to the size of tool bit being used.

FEATURES

A feature of this invention resides in the provision of an improved tool holder or adaptor having a flexible drive coupler which permits limited angular displacement between the body and the center line of the tool bit so as to prevent improper twisting and/or bending which may occur in turning of the tool body from being transferred to the tool bit.

Another feature of this invention resides in the provision of a tool holder or adaptor constructed and arranged so as to permit any excessive twisting and/or bending to be visibly noted.

Another feature of this invention resides in the provision of a tool holder or adaptor having a flexible torque drive arranged to effect self-alignment of the tool bit to result in greater accuracy in forming a work piece.

Another feature of this invention resides in the provision of a frangible member which will render the tool inoperative in the event the applied torque is excessive and thereby prohibit the cutting tool itself from breaking and/or damaging the work piece.

Another feature of this invention resides in a tool holder or wrench which can be readily adjusted to accommodate any of several varying loadings to protect any of the variously sized tool bits adapted to be utilized in conjunction therewith.

Other features and advantages will become more readily apparent when considered in view of the drawings and specification in which:

FIG. 3 illustrates a modified form of the invention.

FIG. 4 is a plan view taken along lines 4—4 on FIG. 3.

FIG. 9 illustrates another modified embodiment of the invention having portions thereof shown in section.

FIG. 10 is a sectional view taken along line 10-10 on FIG. 9.

FIG. 11 illustrates a side elevation view of still another modified form of the invention having portions thereof shown in section.

Figure 6:
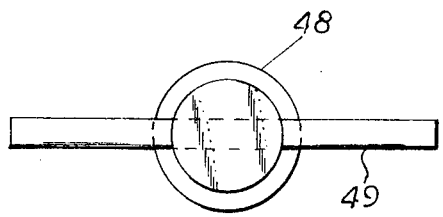
FIG. 6 is a top plan view of the embodiment of FIG. 5.
Figure 2:
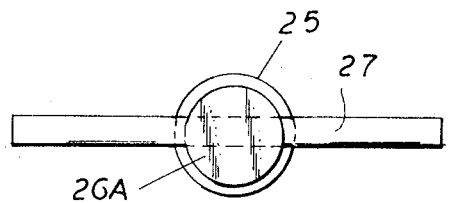
FIG. 2 is a top plan view of FIG. 1.
Figure 1:
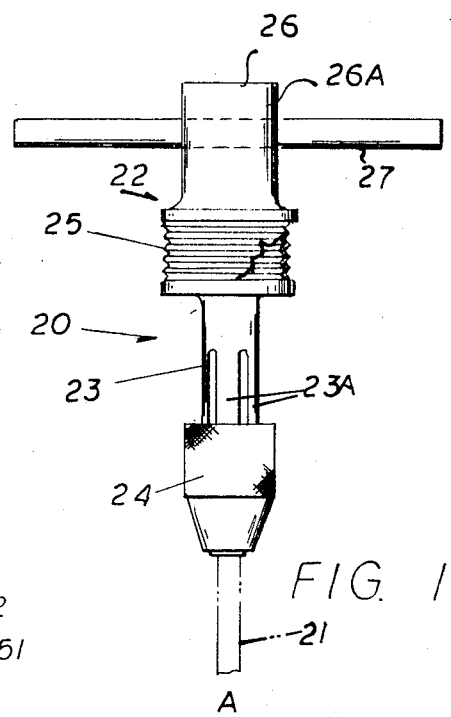
FIG. 1 is a side elevation view of a tool holder embodying the present invention and having portions thereof broken away.

Referring to the drawings there is shown in FIGS. 1 and 2 a cutting tool holder or wrench 20 adapted to detachably receive a cutting tool bit 21 as for example, a tap, drill, bore, reamer or like cutting tool. It will be understood that the tool bit 21 comprises a bit of any conventional construction and consequently the present invention is not directed to the cutting or tapping tool bit 21, per se, but to a wrench or adaptor 20 by which the tool bit may be operated.

The embodiment 20 of FIGS. 1 and 2 comprises a body means 22 having an elongated shank portion 23 which is formed with a plurality of longitudinally extending spring fingers 23A to define a chuck end for frictionally gripping the end of a tool bit 21 as for example, a tap or the like. A chuck collar 24 is suitably threaded to the spring fingers 23A of the shank portion 23 for drawing the ends of the spring fingers 23A into gripping relationship with the end of the tool bit when the collar 24 is tightened.

Connected intermediate the body means 22 of the tool holder 20 is a flexible torque drive 25. As shown, the flexible torque drive coupling 25 comprises a flexible bellows interposed between the tool end portion 24 and the opposite handle end portion 26. As shown, the upper handle end 26 is provided with a transversely extending bore 26A for receiving a handle means in the form of a transversely extending cross arm 27 inserted through the bore. The flexible coupling drive 25 is preferably formed of corrugated sheet material which will permit flexing of the tool body relative to the central longitudinal axis of the tool bit 21 and associated shank portion 23.

In operation it will be apparent that the flexible drive coupling 25 will permit limited angular deflection of the tool body to occur without effecting misalignment between the tool bit and the hole being formed or tapped thereby. Consequently as the tool bit 21 is not subjected to a bending moment in the event the tool body bends during hand operation, the tool bit 21 is maintained in alignment with the hole being formed. Thus the flexible drive coupling 25 permits angular displacement to occur between the tool body and the center line of the tool bit without resulting in any misalignment to occur between the center line of the tool bit and the hole being formed thereby. The flexible bellows coupling 25 thus prohibits any improper bending or twisting of the tool body or wrench which may occur in operation from being transferred to the cutting tool bit 21. Also the flexible coupling makes visibly obvious to the user any excessive twisting or bending. The flexible coupling 25 also imparts to the tool body a floating action which induces a self-aligning feature which enables the tool bit 21 to cut closer fitting thread or a reamer to cut a closer fitting hole.

FIGS. 3 and 4 illustrate another modified embodiment of the invention. In this form of the invention the tool body 30 is illustrated in the form of an adaptor having a shank portion 31 having formed on one end thereof a socket 32 adapted to receive the upper end of a conventional tool bit 33, as for example, a tap, reamer, drill bit and the like. The upper end of the tool body 30 is provided with a handle or gripping portion 34 by which the shank may be rotated, e.g. by the chuck end 35 of a conventional wrench.

Interposed intermediate the length of the shank portion 31 is a reduced section 36 which is designed to fracture in the event of any excessive torque and/or bending moment applied to the tool body during the operation thereof.

Disposed between the reduced section 36 and the upper end 34 of the tool body 30 is a flexible drive coupling 38 in the form of a bellows construction similar to that described with respect to the embodiment of FIG. 1. In this form of the invention the flexible drive coupling 38 is cooperatively associated with the reduced section 36 of the shank 31 so that in the event any excessive torque is applied to the tool body, it will cause the body to fracture at the reduced section, rather than in the tool bit 33. It will be understood that the shear stress of the reduced section 36 is designed so as to be less than the shear stress of the tool bit so that any breakage will occur at 36. Accordingly, the arrangement is such that the tool holder 30 is adapted to fracture at 36 before the tool bit breaks or binds in a work piece.

As shown in FIG. 4 the handle or gripping portion 34 extending beyond the flexible drive coupling 38 is illustrated as being rectangular in cross section so as to facilitate the gripping thereof either by hand or by a conventional wrench 35. In operation the tool holder 30 of FIGS. 3 and 4 functions in much the same manner as that described with respect to FIG. 1 with the added provision that a shear means 36 is interposed intermediate the body of the holder to include a frangible section designed to fracture in the event the applied torque exceeds the shearing or bending stresses of the tool bit 33.

FIGS. 5-8 illustrate another modified form of the invention. In this form the tool holder 40 comprises an upper body or shank portion 41 and a lower body or shank portion 42. As shown, the lower end 41A of the upper portion 41 is provided with an internal recess 43 which is adapted to frictionally receive the upper end 42A of the lower shank portion 42. A retaining ring 44 is interposed between the abutting surfaces of the upper and lower shank portion to detachably couple the lower end portion 42 to the upper end portion 41.

The lower end portion 42 includes a shank 42B provided with a plurality of spring fingers 45 to define a chuck end to which a chuck collar 46 is threaded to define a chuck holding means for detachably securing the upper end of a tool bit 47 thereto.

Connected intermediate the upper shank portion 41 is a flexible drive coupling in the form of a flexible bellows 48 similar to that described with respect to FIGS. 1 and 3. Connected to the upper end of the flexible bellows 40 is a handle means in the form of a transversely extending cross arm 49 by which the tool holder may be turned.

In this form of the invention the upper end portion 42B of the lower shank member 42 is provided with an internal recess 50 which is adapted to receive a shear member 51.

Figure 5:
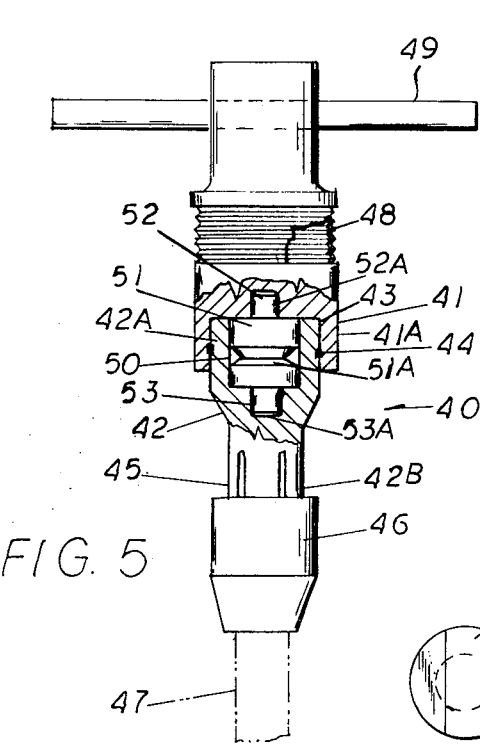
FIG. 5 illustrates a side elevation view of another modified form of the invention having portions thereof shown in section.
Figure 8:
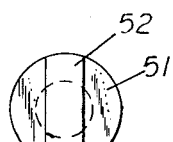
FIG. 8 is a top plan view of FIG. 7.
Figure 7:
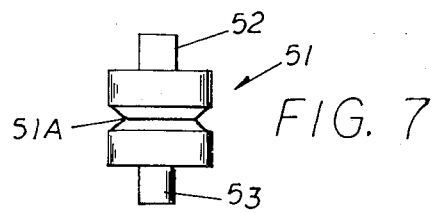
FIG. 7 is a detailed side elevation view of the frangible member utilized in the embodiment of FIG. 5.

Referring to FIGS. 5, 7 and 8 the shear member 51 comprises a member having a reduced section 51A of predetermined shear stress. Connected to the opposed ends of the shear member 51 is a transversely extending driver 52, 53 adapted to be received in complementary slots 52A, 53A formed in the upper and lower members 41, 42 whereby the shear member 51 functions as the drive connector between the upper shank portion 41 and the lower shank portion 42 in the assembled position as seen in FIG. 5. In the assembled position as seen in FIG. 5, it will be understood that torque applied to the upper body portion 41 is transmitted to the lower shank portion 42 through flexible torque drive coupler 48 and the shear member 51. The arrangment is such that the flexible drive coupler 48 permits limited angular displacement between the center line of the tool body and the tool bit without affecting the alignment between tool bit 47 and the hole or tap being formed thereby. In the event excessive torque is applied to the tool body 40, the shear member 51 will fracture at the reduced section 51A before breakage will occur in the tool bit 47. Should such excessive torque fracture the shear member 51, an operator can readily correct the difficulty by effecting separation of the upper and lower body portions 41, 42, remove the fractured shear member, replace the same with a new one; and reassemble the lower shank portion 42 to the upper shank portion 41.

It will be understood that the shear member 51 may be specifically constructed to complement a particular tool bit. Thus, the tool holder 40 of FIG. 5 may be readily adapted with any of several different shear members 51, each having varying breaking points which are rated to complement a particular tool bit size.

FIGS. 9 and 10 illustrate another modified embodiment. In this form of the invention the tool holder 60 comprises an upper body portion 61 and a lower body portion 62, each formed with a complementary flange 61A, 62A which are adapted to be disposed in abutting relationship in the assembled position thereof.

As seen in FIG. 9 the lower body member 62 is provided with a center projection or boss 63 which is adapted to be received within a complementary recess 64 formed in the lower end of the upper body member 61. A retaining ring 65 interconnects the upper and lower body members 61, 62 in a readily detachable manner.

Interposed intermediate the upper body portion 61 is a flexible drive coupler in the form of a bellows 66 constructed similar to that hereinbefore described.

The lower shank portion 62 is provided with a chuck end and collar 67 similar to that described in FIGS. 1 and 5.

As best seen in FIG. 10, it will be noted that the complementary flanges 61A and 62A of the upper and lower body portions 61 and 62 are provided with a series of circumscribing spaced openings 68, each opening having a different diameter. A shear member 69 in the form of a shear pin having a frangible section 69A is inserted through one of the aligned openings. The shear section 69A of the shear pin 69 is adapted to be coincident with the abutting surfaces of the respective flanges 61A, 62A. Accordingly, the arrangement of FIG. 9 is such that whenever an excessive torque or bending moment is applied to the tool or wrench 60 a fracture will occur at the rupture point 69A of the shear member 69. By providing a series of varying diameter aligned openings 68 in the respective flanges 61A, 62A, the selection of the appropriate shear member 69 will adapt tool 60 to a predetermined sized tool bit 70.

FIG. 11 illustrates still another modified form of the invention. In this form of the invention the tool holder 71 comprises an upper body portion 72 and a lower body portion 73. The lower body portion 73 is provided with a plurality of spring fingers 73A to define a chuck end for receiving the end of a tool bit 74 in a manner hereinbefore described with respect to FIGS. 1, 5 and 9; and a chuck collar 75 is threaded to the spring fingers 73A to effect the expansion or contraction thereof on the upper end of the tool bit.

Connected to the upper portion 72 is the flexible drive coupling in the form of a bellows 76 similar to that hereinbefore described with the embodiments of FIGS. 1, 5 and 9. A transversely extending handle 77 extends through a bore 78 formed in the upper end or the upper body portion. As seen in FIG. 11 the upper and lower body portions 72, 73 are provided with complementary male and female components 79 and 80 which are interfitted one to the other. As shown, the male and female portions 79 and 80 of the upper and lower body portions 72, 73 are provided with aligned bores 81 extending therethrough adapted to receive a shear member in the form of a shear pin 82 having a reduced section 82A designed to fracture at a predetermined shear load. In operation it will be noted that the tool holder of FIG. 11 will function similar to the embodiments hereinbefore described. That is, that the shear member 82 of FIG. 11 is designed to break or shear before the tap or tool bit 74 itself breaks due to any excessive torque, misalignment and/or bending moment applied to the tool body 71. It will be understood that by controlling the size or stress of reduced sections 82A of the shear member 82 that the tap holder 71 of FIG. 11 can be adjusted to effect a fracture at any predetermined shear load.

From the foregoing description it will be noted that each of the described tool holders is readily adapted to receive conventionally formed tool bits, and that each holder is constructed to prevent loss or damage of any finished or semi-finished work pieces due to tool bit breakage therein. Also the respective tool holders function to prevent breakage and/or loss of the tool bit which frequently may comprise a considerable cost item. The respective tool holders are constructed so that alignment of the tool bit may be maintained in the forming or tapping of a hole even though a bending moment is applied to the tool body during the turning thereof.

In the embodiments of FIGS. 3, 5, 9 and 11 provisions are also provided for complementing the flexible drive coupling with shear members adapted to fracture at a predetermined shear load to preserve the tool bit and/or the work piece being formed thereby in the event of excessive torque being imparted to the tool holder. The respective tool holders thus prohibit improper twisting or bending which may occur in operation from being transferred to the tool bit, and thereby maintain the alignment of the tool bit and the hole being formed thereby.

While the present invention has been defined with respect to several embodiments thereof it will be readily appreciated and understood that variations and modifications may be made without departing from the spirit or scope of the invention.

What is claimed is:

1. A cutting tool holder adapted to detachably support a cutting tool bit comprising:
   a body means,
   said body means including a holding means adapted for detachably supporting a cutting tool bit to said body means,
   handle means operatively connected to said body means, and
   a flexible coupling means interposed in said body means between said handle means and said holding means to permit limited angular deflection of said body means relative to the center line of said tool bit adapted to be secured thereto,
   and including:
   a frangible shear means on said body means having a predetermined shear stress whereby said shear means is adapted to fracture when the applied torque on said body means exceeds the predetermined shear stress of said frangible means.

2. A cutting tool holder adapted to detachably support a cutting tool bit comprising:
   a body means,
   said body means including a holding means adapted for detachably supporting a cutting tool bit to said body means,
   handle means operatively connected to said body means, and
   a flexible coupling means interposed in said body means between said handle means and said holding means to permit limited angular deflection of said body means relative to the center line of said tool bit adapted to be secured thereto,
   wherein said flexible coupling means includes a bellows torque drive.

3. The invention as defined in claim 2 wherein said body means includes:
   a shank portion,
   said tool bit holding means being connected to one end of said shank portion, and
   said bellows torque drive being connected to the other end of said shank portion,
   and said handle means being connected to said body means above said bellows torque drive.

4. The invention as defined in claim 3 wherein said holding means includes a plurality of spring fingers integrally formed with said shank portion to define an expandible holder for a tool bit,
   and a chuck collar threaded to said fingers for detachably securing a tool bit between said fingers.

5. A cutting tool holder adapted to detachably support a cutting tool bit comprising:
   a body means,
   said body means including a holding means adapted for detachably supporting a cutting tool bit to said body means,
   handle means operatively connected to said body means, and
   a flexible coupling means interposed in said body means between said handle means and said holding means to permit limited angular deflection of said body means relative to the center line of said tool bit adapted to be secured thereto,
   wherein said flexible coupling means includes a bellows torque drive,
   and a frangible shear means having a predetermined breaking stress whereby said shear means fractures when the applied torque on said torque drive exceeds said breaking stress.

6. The invention as defined in claim 5 wherein said body means includes a shank portion, and
   said shear means includes a shear groove circumscribing said shank portion intermediate the ends thereof.

7. The invention as defined in claim 5 wherein said body means includes an upper shank portion and a lower shank portion, and
   said shear means being interposed between said upper and lower shank portions.

8. The invention as defined in claim 7 wherein said shear means includes a shear pin having a frangible section interconnecting said upper and lower shank portions.

9. The invention as defined in claim 8 wherein said upper and lower shank portions have complementary laterally extending flanges having aligned openings therein, and
   said shear pin extends through said aligned opening to secure said flanges together.

10. The invention as defined in claim 9 wherein said flanges include a plurality of circumferentially spaced aligned openings
    said aligned openings having progressively increasing diameters for accommodating a shear pin of complementary size whereby the maximum applied torque may be varied accordingly.

11. The invention as defined in claim 7 wherein said upper shank portions and lower shank portions have complementary interfitting portions,
    means for detachably securing said shank portions together, and said shear means being interposed between upper and lower shank portions to connected said portions in driving relationship.

12. The invention as defined in claim 11 wherein said upper and lower shank portions define a recess therebetween,
   said shear means being disposed within said recess,
   said shear means including pin having a frangible section, and
   said pin having opposed drive connections, and
   said upper and lower shank portions having complementary drive connections to mate with the drive connections of said pin.

13. A tool holder adaptor comprising:
   an adaptor body,
   said body having a tool bit holder formed in one end thereof for engaging with the end of a tool bit, and having a shear groove circumscribing an intermediate portion of said body,
   a bellows torque drive connected to said body,
   and a shank connected to said bellows torque drive extending upwardly thereof,
   said shank being adapted to be received in the chuck end of a wrench.

14. A wrench adapted for maintaining the alignment of an associated cutting tool bit during a cutting operation comprising:
   a wrench body having an upper body portion and a lower body portion,
   said lower body portion having means for receiving a cutting tool bit,
   means for interconnecting said body portions together,
   said connecting means including a shear means having a predetermined fracturing stress,
   and a bellows torque drive connected to the upper body portion to permit limited angular deflection of said upper body portion relative to the longitudinal axis of said lower body portion and associated tool bit.

15. The invention as defined in claim 14 wherein said upper and lower body portions have complementary flanges adapted to be disposed in abutting relationship,
   said flanges having aligned openings therein,
   said shear means comprising a shear pin extending through said aligned openings,
   said shear pin having a shear groove formed therein,
   said shear groove being disposed in a plane of the abutting surface of said flanges.

16. The invention as defined in claim 14 wherein said upper and lower body portions include complementary interfitting male and female end portions,
   said complementary end portions having a transversely extending aligned opening,
   and a shear pin extended through said openings for connecting said body portions together in driving relationship.

17. The invention as defined in claim 14 wherein
   said body portion includes complementary interfitting male and female end portions,
   said interconnecting means including a retainer means for detachably coupling said end portions together,
   one of said end portions having a recess formed therein, and
   said shear means comprising a shear pin having opposed drive connectors,
   and means formed in the respective end portions of said upper and lower body portions to engage in driving connection with said drive connectors.

* * * * *